(12) United States Patent
Nishimura et al.

(10) Patent No.: US 10,587,203 B2
(45) Date of Patent: Mar. 10, 2020

(54) POWER CONVERSION APPARATUS

(71) Applicant: TOSHIBA MITSUBISHI-ELECTRIC INDUSTRIAL SYSTEMS CORPORATION, Chuo-ku (JP)

(72) Inventors: Kazuki Nishimura, Chuo-ku (JP); Toshihide Nakano, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 6 days.

(21) Appl. No.: 16/323,974

(22) PCT Filed: Nov. 17, 2016

(86) PCT No.: PCT/JP2016/084084
§ 371 (c)(1),
(2) Date: Feb. 7, 2019

(87) PCT Pub. No.: WO2018/092240
PCT Pub. Date: May 24, 2018

(65) Prior Publication Data
US 2019/0214811 A1    Jul. 11, 2019

(51) Int. Cl.
*H02M 5/458* (2006.01)
*H02H 7/12* (2006.01)
*H02M 1/32* (2007.01)
*H02M 7/487* (2007.01)

(52) U.S. Cl.
CPC ........ *H02M 5/4585* (2013.01); *H02H 7/1216* (2013.01); *H02M 1/32* (2013.01); *H02M 7/487* (2013.01)

(58) Field of Classification Search
CPC ........ H02M 5/40; H02M 5/453; H02M 5/458; H02M 5/4585; H02H 7/1216
See application file for complete search history.

(56) References Cited

U.S. PATENT DOCUMENTS

| 8,208,276 | B2 * | 6/2012 | Sato | H02J 9/062 363/131 |
| 8,508,957 | B2 * | 8/2013 | Sato | H02J 9/062 363/131 |
| 2011/0051478 | A1 | 3/2011 | Sato et al. | |
| 2011/0299307 | A1 * | 12/2011 | Sato | H02J 9/062 363/34 |
| 2017/0040906 | A1 * | 2/2017 | Hattori | H02M 7/48 |
| 2017/0197509 | A1 * | 7/2017 | Lehnert | H02H 3/05 |

FOREIGN PATENT DOCUMENTS

WO    WO 2010/095241 A1    8/2010

OTHER PUBLICATIONS

International Search Report dated Dec. 13, 2016, in PCT/JP2016/084084 filed on Nov. 17, 2016.

* cited by examiner

*Primary Examiner* — Kyle J Moody
(74) *Attorney, Agent, or Firm* — Oblon, McClelland, Maier & Neustadt, L.L.P.

(57) ABSTRACT

A power conversion apparatus in which wiring lines are provided between DC buses of a first converter unit and DC buses of a second converter unit. The wiring lines are provided between the DC buses of the second converter unit and DC buses of a third converter unit. Fuses are interposed in the wiring lines, respectively.

4 Claims, 8 Drawing Sheets

POWER CONVERSION APPARATUS

TECHNICAL FIELD

The present invention relates to power conversion apparatuses.

BACKGROUND ART

A power conversion apparatus used in an uninterruptible power supply apparatus generally includes a converter that converts AC power from a commercial AC power supply into DC power and an inverter that converts the DC power into AC power with a desired frequency and a desired voltage.

For example, WO 2010/095241 (PTL 1) discloses an uninterruptible power supply apparatus formed of a power conversion apparatus including a three-level converter and a three-level inverter. In this power conversion apparatus, the three-level converter and the three-level inverter each include a plurality of semiconductor switching devices.

In the power conversion apparatus described above, if any of the plurality of semiconductor switching devices shorts out through breakage, overcurrent or overvoltage may occur. In PTL 1, a fuse is connected between one terminal of each semiconductor switching device and a DC bus (DC positive bus, DC negative bus, or DC neutral bus). This configuration melts the fuse to interrupt a path through which current flows if any of the semiconductor switching devices shorts out, thus preventing an occurrence of overcurrent or overvoltage.

CITATION LIST

Patent Literature

PTL 1: WO 2010/095241

SUMMARY OF INVENTION

Technical Problem

In the power conversion apparatus described in PTL 1, however, the fuse is provided in the current path between the semiconductor switching device and the DC bus, allowing a current to constantly flow through the fuse during the normal operations of the three-level converter and the three-level inverter. To prevent the fuse from melting inadvertently in such a state, a fuse having a rated current value greater than that of a current flowing through the converter and the inverter is required in PTL 1.

In the use of a fuse having a great rated current value as described above, the fuse will not melt until a short-circuit current exceeding the rated current value flows. As a result, a large short-circuit current may flow through the current path during a period from a failure of the semiconductor switching device to melting of the fuse, damaging another normal semiconductor switching device and another normal diode.

According to PTL 1, nine fuses are used in total for each of the three-level converter and the three-level inverter. Thus, the use of a fuse having a great rated current value for each fuse may increase the size and cost of the apparatus.

Further, according to PTL 1, a power loss generated in each fuse during the operation of the power conversion apparatus may increase, reducing the efficiency of the power conversion apparatus.

A main object of the present invention is therefore to provide a power conversion apparatus capable of achieving an effect of preventing high overcurrent and high overvoltage with a simple configuration.

Solution to Problem

A power conversion apparatus according to an aspect of the present invention is configured to convert first-phase to third-phase AC voltages supplied from an AC power supply into fourth-phase to sixth-phase AC voltages and supply the fourth-phase to sixth-phase AC voltages to a load. The power conversion apparatus includes first to third power converters. The first power converter is configured to convert the first-phase AC voltage into the fourth-phase AC voltage. The second power converter is configured to convert the second-phase AC voltage into the fifth-phase AC voltage. The third power converter is configured to convert the third-phase AC voltage into the sixth-phase AC voltage. The first power converter includes a first-phase converter, a fourth-phase inverter, and a first DC positive bus and a first DC negative bus. The first-phase converter is configured to convert the first-phase AC voltage into a first DC voltage. The fourth-phase inverter is configured to convert the first DC voltage supplied from the first-phase converter into the fourth-phase AC voltage. The first DC positive bus and the first DC negative bus are connected between the first-phase converter and the fourth-phase inverter. The second power converter includes a second-phase converter, a fifth-phase inverter, and a second DC positive bus and a second DC negative bus. The second-phase converter is configured to convert the second-phase AC voltage into a second DC voltage. The fifth-phase inverter is configured to convert the second DC voltage supplied from the second-phase converter into the fifth-phase AC voltage. The second DC positive bus and the second DC negative bus are connected between the second-phase converter and the fifth-phase inverter. The third power converter includes a third-phase converter, a sixth-phase inverter, and a third DC positive bus and a third DC negative bus. The third-phase converter is configured to convert the third-phase AC voltage into a third DC voltage. The sixth-phase inverter is configured to convert the third DC voltage supplied from the third-phase converter into the sixth-phase AC voltage. The third DC positive bus and the third DC negative bus are connected between the third-phase converter and the sixth-phase inverter. The power conversion apparatus further includes first to fourth fuses. The first fuse is connected between the first and second DC positive buses, and the second fuse is connected between the second and third DC positive buses. The third fuse is connected between the first and second DC negative buses, and the fourth fuse is connected between the second and third DC negative buses.

Advantageous Effects of Invention

The present invention can provide a power conversion apparatus capable of achieving an effect of preventing high overcurrent and high overvoltage with a simple configuration.

DESCRIPTION OF EMBODIMENTS

Figure 1:
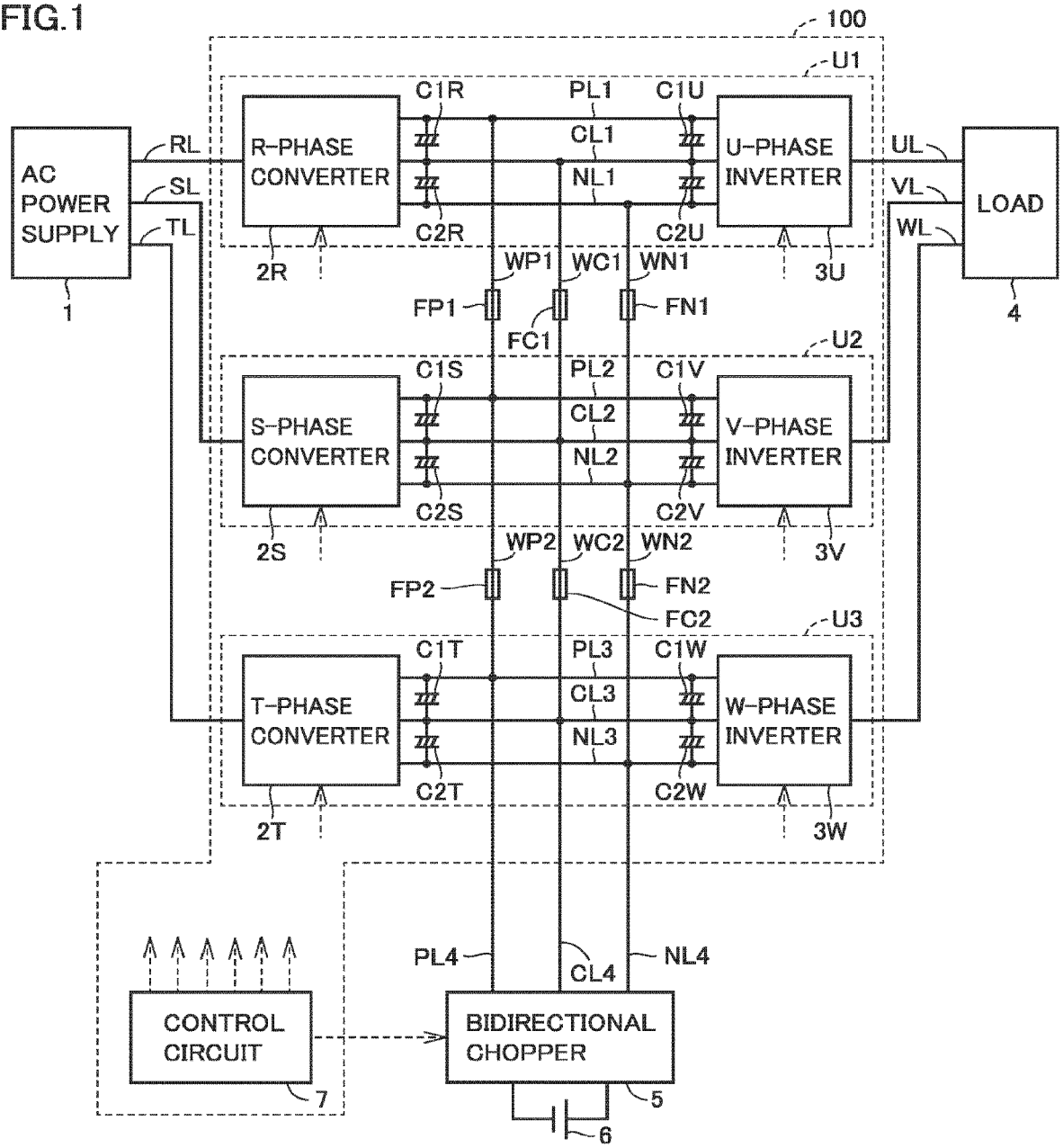
FIG. 1 is a schematic block diagram showing a main circuit configuration of a power conversion apparatus according to an embodiment of the present invention.

Embodiments of the present invention will be described below in detail with reference to the drawings. The same or corresponding elements in the drawings have the same reference characters allotted, and description thereof will not be repeated in principle.

FIG. 1 is a schematic block diagram showing a main circuit configuration of a power conversion apparatus 100 according to an embodiment of the present invention. Power conversion apparatus 100 according to the embodiment of the present invention is used in, for example, an uninterruptible power supply apparatus. An AC power supply 1 supplies three-phase AC power of commercial frequency to power conversion apparatus 100. A load 4 is driven by the three-phase AC power of commercial frequency supplied from power conversion apparatus 100.

With reference to FIG. 1, power conversion apparatus 100 includes three converter units U1 to U3 connected in parallel between AC power supply 1 and load 4. Power conversion apparatus 100 further includes wiring lines WP1, WP2, WN1, WN2, WC1, and WC2, and a control circuit 7. Power conversion apparatus 100 is connected to a DC positive bus PL4, a DC negative bus NL4, a DC neutral bus CL4, a bidirectional chopper 5, and a DC power supply 6, thereby constituting an uninterruptible power supply apparatus.

First converter unit U1 includes an R-phase converter 2R, a U-phase inverter 3U, a DC positive bus PL1, a DC negative bus NL1, a DC neutral bus CL1, and capacitors C1R, C2R, C1U, and C2U.

R-phase converter 2R is supplied with an R-phase voltage from AC power supply 1 through an R-phase line RL. R-phase converter 2R converts R-phase voltage VR into a DC voltage and supplies the DC voltage to U-phase inverter 3U through DC buses PL1, CL1, and NL1. U-phase inverter 3U converts the DC voltage from R-phase converter 2R into a U-phase voltage VU. U-phase voltage VU generated in U-phase inverter 3U is supplied to load 4 through a U-phase line UL. Capacitors C1R and C1U are connected in parallel between DC positive bus PL1 and DC neutral bus CL1. Capacitors C2R and C2U are connected in parallel between DC neutral bus CL1 and DC negative bus NL1.

Second converter unit U2 includes an S-phase converter 2S, a V-phase inverter 3V, a DC positive bus PL2, a DC negative bus NL2, a DC neutral bus CL2, and capacitors C1S, C2S, C1V, and C2V.

S-phase converter 2S is supplied with an S-phase voltage VS from AC power supply 1 through an S-phase line SL. S-phase converter 2S converts S-phase voltage VS into a DC voltage and supplies the DC voltage to V-phase inverter 3V through DC buses PL2, CL2, and NL2. V-phase inverter 3V converts the DC voltage from S-phase converter 2S into a V-phase voltage VV. V-phase voltage VV generated in V-phase inverter 3V is supplied to load 4 through a V-phase line VL. Capacitors C1S and C1V are connected in parallel between DC positive bus PL2 and DC neutral bus CL2. Capacitors C2S and C2V are connected in parallel between DC neutral bus CL2 and DC negative bus NL2.

Third converter unit U3 includes a T-phase converter 2T, a W-phase inverter 3W, a DC positive bus PL3, a DC negative bus NL3, a DC neutral bus CL3, and capacitors C1T, C2T, C1W, and C2W.

T-phase converter 2T is supplied with a T-phase voltage from AC power supply 1 through a T-phase line TL. T-phase converter 2T converts T-phase voltage VT into a DC voltage and supplies the DC voltage to W-phase inverter 3W through DC buses PL3, CL3, and NL3. W-phase inverter 3W converts the DC voltage from T-phase converter 2T into a W-phase voltage VW. W-phase voltage VW generated in W-phase inverter 3W is supplied to load 4 through a W-phase line WL. Capacitors C1T and C1W are connected in parallel between DC positive bus PL3 and DC neutral bus CL3. Capacitors C2T and C2W are connected in parallel between DC neutral bus CL3 and DC negative bus NL3.

As described above, each of converter units U1 to U3 includes one single-phase converter, one single-phase inverter, three DC buses (DC positive bus, DC negative bus, DC neutral bus), and four capacitors.

Wiring lines WP1, WN1, and WC1 are provided between first converter unit U1 and second converter unit U2. Specifically, wiring line WP1 is connected between DC positive buses PL1 and PL2. Wiring line WN1 is connected between DC negative buses NL1 and NL2. Wiring line WC1 is connected between DC neutral buses CL1 and CL2.

Wiring lines WP2, WN2, and WC2 are connected between second converter unit U2 and third converter unit U3. Specifically, wiring line WP2 is connected between DC positive buses PL2 and PL3. Wiring line WN2 is connected between DC negative buses NL2 and NL3. Wiring line WC2 is connected between DC neutral buses CL2 and CL3.

DC positive bus PL4, DC negative bus NL4, and DC neutral bus CL4 are provided between third converter unit U3 and bidirectional chopper 5. Specifically, DC positive bus PL4, DC negative bus NL4, and DC neutral bus CL4 are connected between DC positive bus PL3 and bidirectional chopper 5, between DC negative bus NL3 and bidirectional chopper 5, and between DC neutral bus CL3 and bidirectional chopper 5, respectively.

Bidirectional chopper 5 is connected between DC positive bus PL4, DC negative bus NL4 and DC neutral bus CL4, and DC power supply 6. Bidirectional chopper 5 is configured to perform bidirectional DC voltage conversion between DC buses PL4, NL4 and CL4, and DC power supply 6.

DC positive buses PL1, PL2, and PL3 are connected to one another through wiring lines WP1 and WP2. Consequently, the voltages across DC positive buses PL1, PL2, and PL3 can be matched with one another.

DC negative buses NL1, NL2, and NL3 are connected to one another through wiring lines WN1 and WN2. Consequently, the voltages across DC negative buses NL1, NL2, and NL3 can be matched with one another.

DC neutral buses CL1, CL2, and CL3 are connected to one another through wiring lines WC1 and WC2. Consequently, the voltages across DC neutral buses CL1, CL2, and CL3 can be matched with one another.

Such a configuration allows voltages supplied to single-phase inverters 3U, 3V, and 3W of converter units U1 to U3 can be matched with one another. Consequently, the amplitudes of phase voltages output from single-phase inverters 3U, 3V, and 3W can be matched with one another.

An operation of power conversion apparatus 100 according to the present embodiment will now be described.

The three-phase AC power from AC power supply 1 is supplied to R-phase converter 2R, S-phase converter 2S, and T-phase converter 2T through R-phase line RL, S-phase line SL, and T-phase line TL, respectively. R-phase converter 2R, S-phase converter 2S, and T-phase converter 2T constitute a three-phase converter. The three-phase converter converts three-phase AC power supplied from AC power supply 1 into DC power and supplies the DC power to U-phase inverter 3U, V-phase inverter 3V, and W-phase inverter 3W through the DC positive bus, the DC negative bus, and the DC neutral bus, respectively. U-phase inverter 3U, V-phase inverter 3V, and W-phase inverter 3W constitute a three-phase inverter. The three-phase inverter converts the DC power supplied through the DC positive bus, the DC negative bus, and the DC neutral bus into three-phase AC power. The three-phase AC power generated in the three-phase inverter is supplied to load 4 through U-phase line UL, V-phase line VL, and W-phase line WL.

During normal operation in which AC power supply 1 supplies three-phase AC power, bidirectional chopper 5 steps down each of the DC voltage between DC buses PL4 and CL4 and the DC voltage between DC buses CL4 and NL4 and supplies each DC voltage to DC power supply 6, charging DC power supply 6. During a power failure in which a supply of three-phase AC voltage from AC power supply 1 is interrupted, bidirectional chopper 5 boosts the voltage between the terminals of DC power supply 6 and supplies the voltage to each of between DC buses PL4 and CL4 and between DC buses CL4 and NL4, discharging DC power supply 6.

Control circuit 7 controls the operations of the three-phase converter (single-phase converters 2R, 2S, 2T), the three-phase inverter (single-phase inverters 3U, 3V, 3W), and bidirectional chopper 5 based on, for example, a three-phase AC voltage supplied from AC power supply 1, a DC voltage across each of DC buses PL4, NL4, and CL4, a voltage between the terminals of DC power supply 6, a three-phase AC voltage output from the three-phase inverter (single-phase inverters 3U, 3V, 3W), and a three-phase AC current (load current) flowing through load 4.

Figure 2:
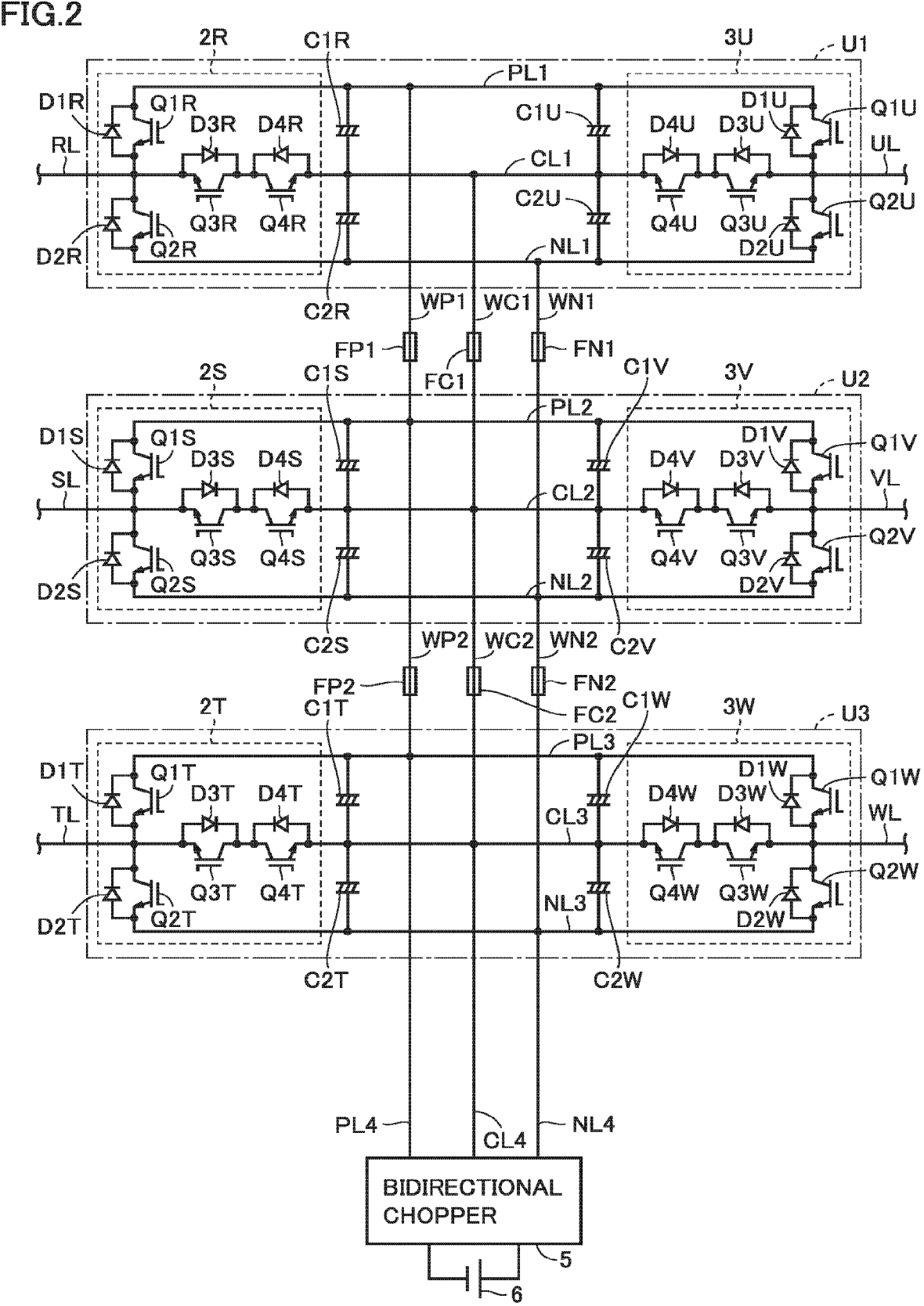
FIG. 2 is a circuit diagram illustrating the configurations of a single-phase converter and a single-phase inverter shown in FIG. 1 in detail.

FIG. 2 is a circuit diagram illustrating configurations of single-phase converters 2R, 2S, and 2T and single-phase inverters 3U, 3V, and 3W shown in FIG. 1 in detail.

With reference to FIG. 2, R-phase converter 2R includes IGBT devices Q1R to Q4R and diodes D1R to D4R. S-phase converter 2S includes IGBT devices Q1S to Q4S and diodes D1S to D4S. T-phase converter 2T includes IGBT devices Q1T to Q4T and diodes D1T to D4T. U-phase inverter 3U includes IGBT devices Q1U to Q4U and diodes D1U to D4U. V-phase inverter 3V includes IGBT devices Q1V to Q4V and diodes D1V to D4V. W-phase inverter 3W includes IGBT devices Q1W to Q4W and diodes D1W to D4W.

Herein, to collectively describe the configurations of single-phase converters 2R, 2S, and 2T and single-phase inverters 3U, 3V, and 3W, signs R, S, T, U, V, and W are collectively referred to as "x". Also, DC positive buses PL1, PL2, and PL3 are collectively referred to as "PLi", DC negative buses NL1, NL2, and NL3 are collectively referred to as "NLi", and DC neutral buses CL1, CL2, and CL3 are collectively referred to as "CLi".

An IGBT device Q1$x$ has an emitter connected to an x-phase line xL and a collector connected to a DC positive bus PLi. An IGBT device Q2$x$ has a collector connected to x-phase line xL and an emitter connected to a DC negative bus NLi. An IGBT device Q3$x$ has an emitter connected to x-phase line xL and a collector connected to the collector of an IGBT device Q4$x$. TGBT device Q4$x$ has an emitter connected to a DC neutral bus CLi. Diodes D1$x$ and D2$x$ each function as a reflux diode, and diodes D3$x$ and D4$x$ each function as a clamping diode. IGBT devices Q3$x$ and Q4$x$ and diodes D3$x$ and D4$x$ constitute an AC switch.

Figure 3:
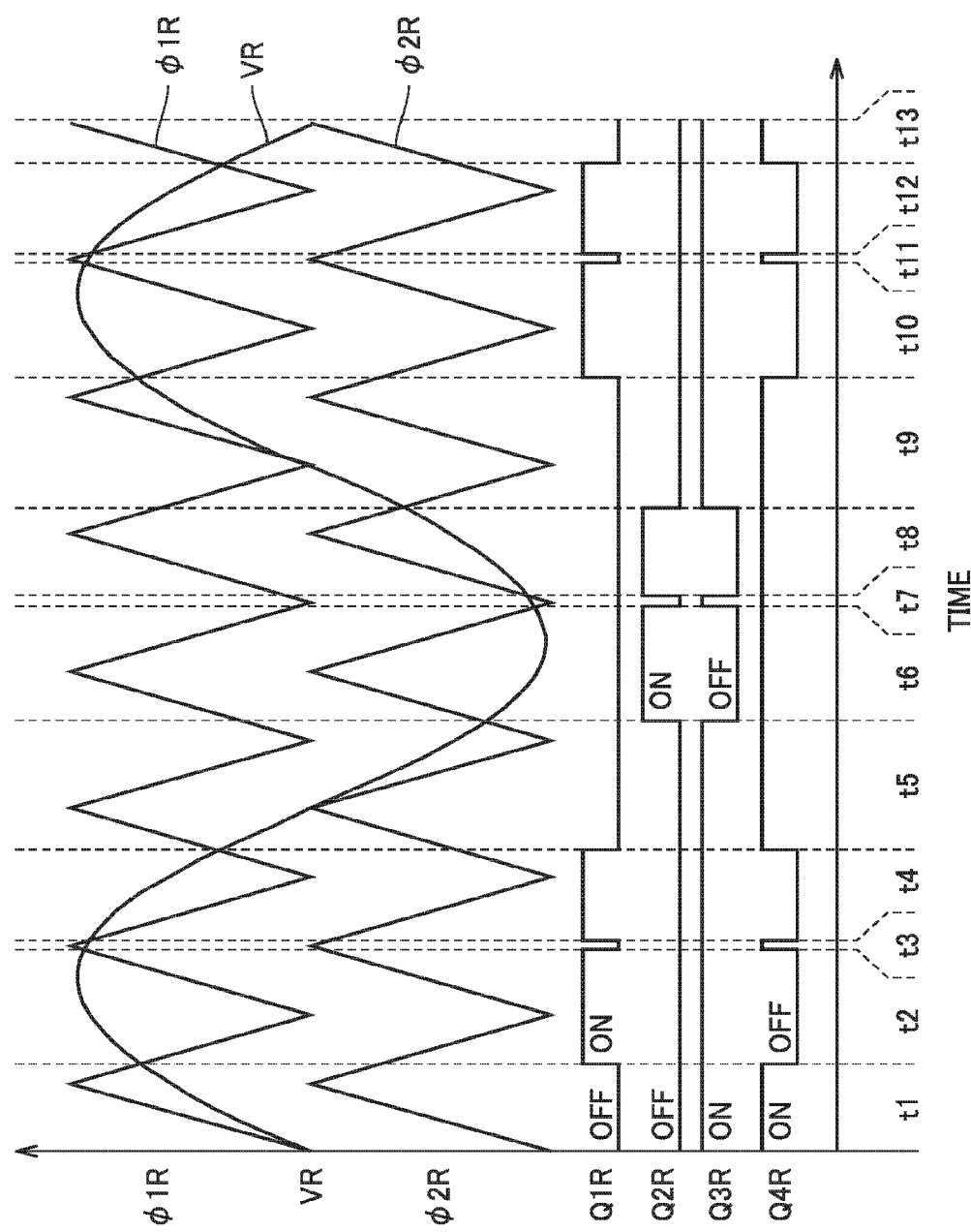
FIG. 3 is a waveform chart for illustrating on/off timing of an IGBT device shown in FIG. 2.

The operations of single-phase converters 2R, 2S, and 2T and single-phase inverters 3U, 3V, and 3W will now be described. FIG. 3 is a waveform chart showing the relationship between R-phase voltage VR and ON/OFF of IGBT devices Q1R to Q4R. The magnitude is compared between R-phase voltage VR and reference signals φ1R and φ2R, and based on a result of the comparison, an ON/OFF combination of IGBT devices Q1R to Q4R is determined.

Reference signals φ1R and φ2R are triangular wave signals having a frequency five times that of R-phase voltage VR and synchronized with R-phase voltage VR. Reference signal φ2R is a triangular wave signal in phase with reference signal φ1R.

As shown in FIG. 3, during periods (t1, t3, t5, t7, t9, t11, t13) in which the level of R-phase voltage VR is between the levels of reference signals φ1R and φ2R, IGBT devices Q3R and Q4R are turned on, and IGBT devices Q1R and Q2R are turned off. During periods (t2, t4, t10, t12) in which the level of R-phase voltage Vr is higher than the levels of reference signals φ1R and φ2R, IGBT devices Q1R and Q3R are turned on, and IGBT devices Q2R and Q4R are turned off During periods (t6, t8) in which the level of R-phase voltage Vr is lower than the levels of reference signals φ1R and φ2R, IGBT devices Q2R and Q4R are turned on, and IGBT devices Q1R and Q3R are turned off. The circuits of the other phases, namely S, T, U, V, and W phases, operate similarly to the R-phase circuit.

Again referring to FIGS. 1 and 2, power conversion apparatus 100 further includes fuses FP1, FP2, FN1, FN2, FC1, and FC2.

Fuse FP1 is interposed in wiring line WP1 and melts when overcurrent flows through wiring line WP1. Fuse FN1 is interposed in wiring line WN1 and melts when overcurrent flows through wiring line WN1. Fuse FC1 is interposed in wiring line WC1 and melts when overcurrent flows through wiring line WC1.

Fuse FP2 is interposed in wiring line WP2 and melts when overcurrent flows through wiring line WP2. Fuse FN2 is interposed in wiring line WN2 and melts when overcurrent flows through wiring line WN2. Fuse FC2 is interposed in wiring line WC2 and melts when overcurrent flows through wiring line WC2.

The actions of fuses FP1, FP2, FN1, FN2, FC1, and FC2 will now be described.

Figure 4:
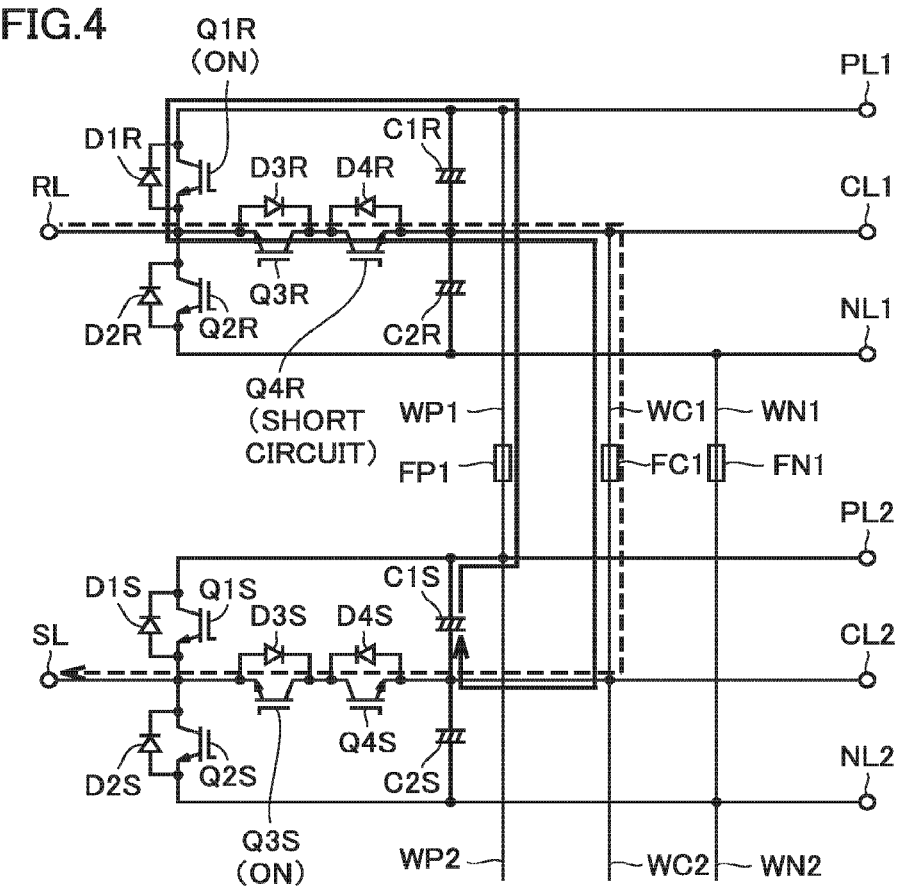
FIG. 4 is a circuit diagram showing the actions of fuses shown in FIG. 2.

FIG. 4 shows a case in which IGBT device Q4R fails and shorts out during a period in which IGBT devices Q1R and Q3S are turned on. In this case, as indicated by a broken arrow in the figure, a short-circuit current flows through a path extending from R-phase line RL through diodes D3R, IGBT device Q4R, wiring line WC1, diode D4S, and IGBT device Q3S to S-phase line SL, so that fuse FC1 melts. Also, as indicated by a solid arrow in the figure, a short-circuit current flows through a path extending from the positive electrode of capacitor C1S through wiring line WP1, IGBT device Q1R, diode D3R, IGBT device Q4R, and wiring line WC1 to the negative electrode of capacitor C1S, so that fuses FP1 and FC1 melt.

Figure 5:
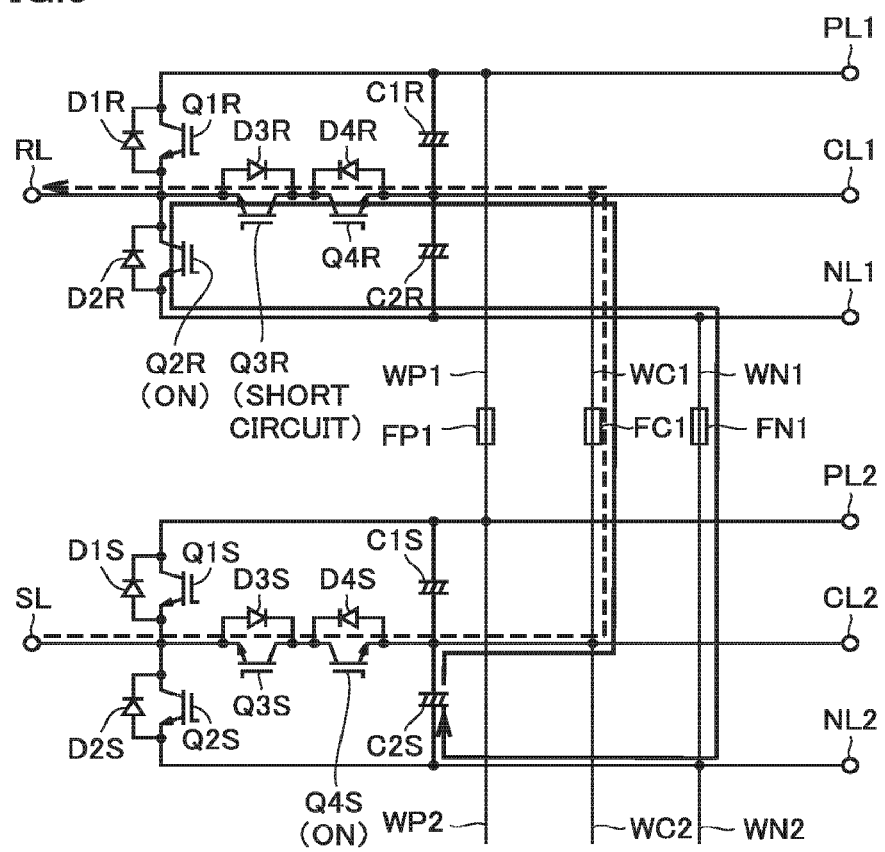
FIG. 5 is a circuit diagram showing the actions of the fuses shown in FIG. 2.

FIG. 5 shows a state in which IGBT device Q3R fails and shorts out during a period in which IGBT devices Q2R and Q4S are turned on. In this case, as indicated by a broken arrow in the figure, a short-circuit current flows through a path extending from S-phase line SL through diode D3S, IGBT device Q4S, wiring line WC1, diode D4R, and IGBT device Q3R to R-phase line RL, so that fuse FC1 melts. Also, as indicated by a solid arrow, a short-circuit current flows through a path extending from the positive electrode of capacitor C2S through wiring line WC1, diode D4R, IGBT device Q3R, IGBT device Q2R, and wiring line WN1 to the negative electrode of capacitor C2S, so that fuses FC1 and FN1 melt.

Figure 6:
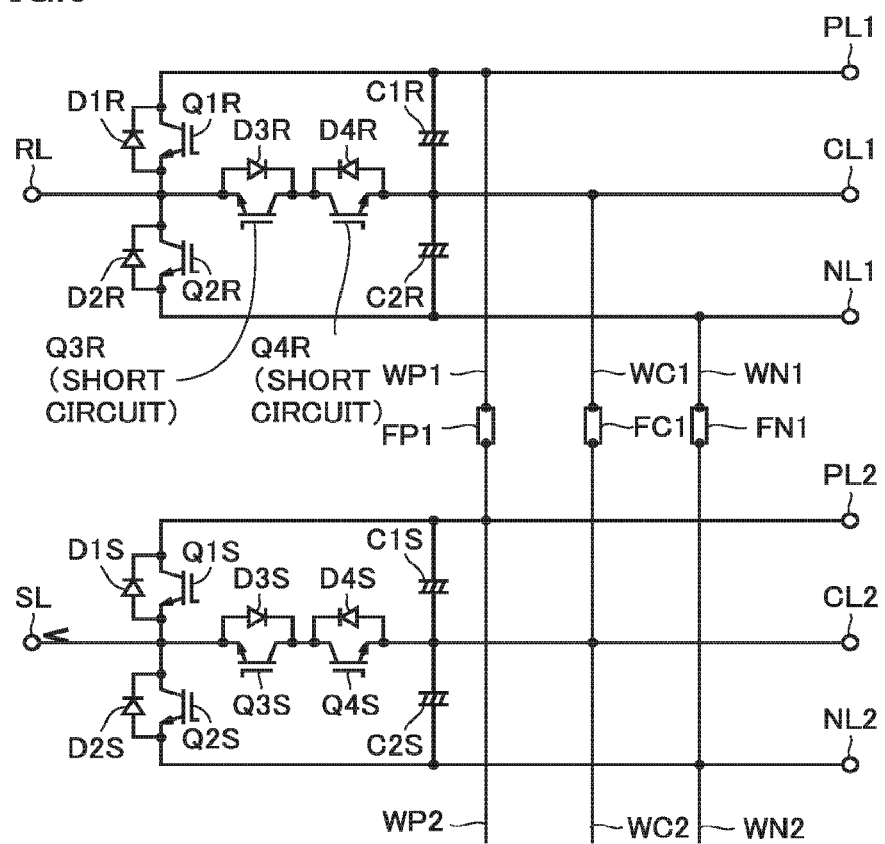
FIG. 6 is a circuit diagram showing the actions of the fuses shown in FIG. 2.

FIG. 6 shows a state in which IGBT devices Q3R and Q4R fail and short out. As shown in FIGS. 4 and 5, since fuses FP1, FC1, and FN1 melt, the R-phase and the S-phase are completely separated from each other. This prevents a flow of overcurrent or an occurrence of overvoltage. Although description has been given by taking the R-phase and S-phase as examples with reference to FIGS. 4 to 6, the same applies to the other phases (T-phase, U-phase, V-phase, W-phase).

Function and Effect of the Present Embodiment

A function and effect of the power conversion apparatus according to the present embodiment will now be described in comparison with a power converter according to a comparative example.

Figure 7:
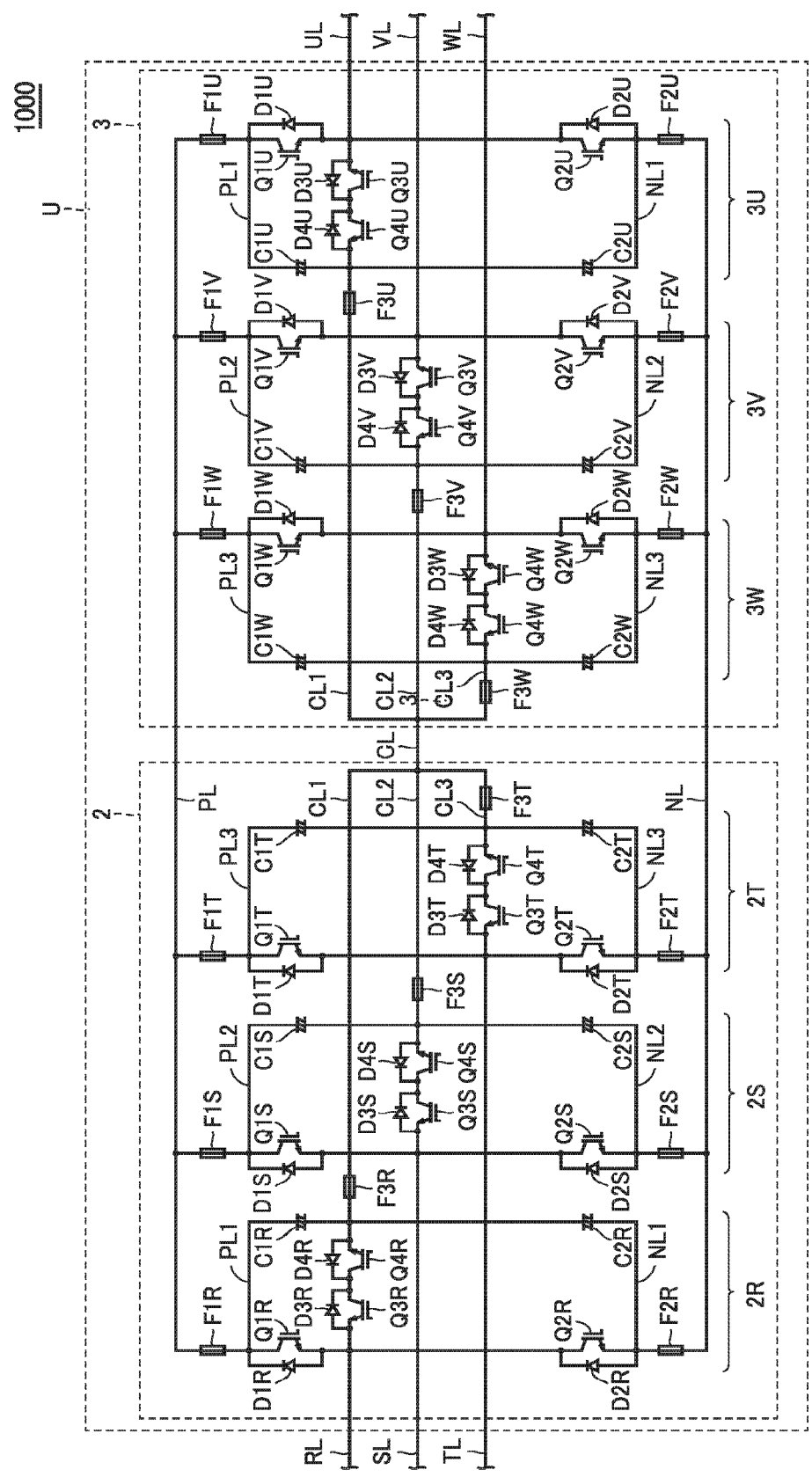
FIG. 7 is a circuit diagram illustrating a configuration of a power conversion apparatus according to a comparative example.

FIG. 7 is a circuit diagram illustrating a configuration of a power conversion apparatus 1000 according to the comparative example. Power conversion apparatus 1000 according to the comparative example corresponds to the power conversion apparatus described in PTL 1. Power conversion apparatus 1000 according to the comparative example is basically similar to power conversion apparatus 100 according to the present embodiment shown in FIG. 1 in the basic configuration composed of a converter and an inverter, but is different therefrom in the configuration of the converter unit.

With reference to FIG. 7, power conversion apparatus 1000 according to the comparative example includes one converter unit U connected between an AC power supply 1 and load 4 (which are not shown). Converter unit U includes three-phase converter 2, three-phase inverter 3, DC positive bus PL, DC negative bus NL, and DC neutral bus CL.

Three-phase converter 2 is configured by connecting R-phase converter 2R, S-phase converter 2S, and T-phase converter 2T shown in FIGS. 1 and 2 in parallel between DC positive bus PL and DC negative bus NL. In this configuration, the DC neutral buses of the converters of the respective phases are connected to DC neutral bus CL in common.

Three-phase inverter 3 is configured by connecting U-phase inverter 3U, V-phase inverter 3V, and W-phase inverter 3W shown in FIGS. 1 and 2 in parallel between DC positive bus PL and DC negative bus NL. In this configuration, the DC neutral buses of the inverters of the respective phases are connected to DC neutral bus CL in common. The operations of three-phase converter 2 and three-phase inverter 3 are substantially identical to the operations of single-phase converters 2R, 2S, and 2T and single-phase inverters 3U, 3V, and 3W described with reference to FIG. 3.

Power conversion apparatus 1000 according to the comparative example further includes fuses F1R to F3R, F1S to F3S, F1T to F3T, F1U to F3U, F1V to F3V, and F1W to F3W. To collectively describe the configurations of these fuses, sings R, S, T, U, V, and W are collectively referred to as "x".

A fuse F1x is connected between the collector of IGBT device Q1x and DC positive bus PL. A fuse F2x is connected between the emitter of IGBT device Q2x and DC negative bus NL. A fuse F3x is connected between the emitter of IGBT device Q4x and DC neutral bus CLx.

As described in PTL 1, in power conversion apparatus 1000 according to the comparative example, for example, if IGBT device Q4R fails and shorts out during a period in which IGBT devices Q1R and Q3S are turned on, a short-circuit current flows through a path extending from R-phase line RL through diode D3R, IGBT device Q4R, fuses F3R and F3S, diode D4S, and IGBT device Q3S to S-phase line SL, so that fuses F3R and F3S melt. Also, a short-circuit current flows through a path extending from the positive electrode of capacitor C1S through fuses F1S and F1R, IGBT device Q1R, diode D3R, IGBT device Q4R, and fuses F3R and F3S to the negative electrode of capacitor C1S, so that fuses F1S, F1R, F3R, and F3S melt.

As described above, also in power conversion apparatus 1000 according to the comparative example, if an IGBT device fails and shorts out, the fuse melts, thereby separating a failed phase and a normal phase from each other. This prevents a flow of overcurrent or an occurrence of overvoltage.

In power conversion apparatus 1000 according to the comparative example, however, each fuse is interposed in a current path during the operations of three-phase converter 2 and three-phase inverter 3. This requires the use of a fuse having a rated current value higher than a maximum value of a current flowing through the current path in order to prevent melting of a fuse during normal operations of three-phase converter 2 and three-phase inverter 3. In the present application, the rated current value of the fuse refers to a current value at which the fuse does not melt when a current is caused to flow through the fuse steadily.

Power conversion apparatus 1000 according to the comparative example requires the use of a fuse having a high rated current value for all of nine fuses. In the use of a fuse having a high rated current value, the fuse will not melt until overcurrent exceeding the rated current value flows. As a result, overcurrent may flow through the current path during a period from the occurrence of a failure to melting of the fuse. Consequently, any other normal IGBT device may be damaged due to the overcurrent or overvoltage that occurs until the fuse melts.

Also, the use of a plurality of fuses having a high rated current value may increase the size and cost of a converter unit U.

Further, in power conversion apparatus 1000 according to the comparative example, the IGBT device and the fuse are electrically connected in series. As a result, during a switching operation of the IGBT device, high surge voltage may be applied to the IGBT device due to a reactor component of the fuse. Thus, a measure for avoiding a failure due to the surge voltage is required.

Also, each fuse is interposed in a current path during the operations of three-phase converter 2 and three-phase inverter 3, which may cause a power loss due to a resistance component caused by each fuse, resulting in a decrease in the efficiency of power conversion apparatus 1000.

Contrastingly, in power conversion apparatus 100 according to the present embodiment, when the single-phase converter and the single-phase inverter operate normally in each of converter units U1 to U3, the voltages across DC positive buses PL1, PL2, and PL3 match with one another in converter units U1 to U3. Similarly, the voltages across DC negative buses NL1, NL2, and NL3 match with one another, and the voltages across DC neutral buses CL1, CL2, and CL3 match with one another. When the voltages across DC positive buses PL1, PL2, and PL3 slightly differ from one another due to a slight deviation of the operations of the single-phase converter and the single-phase inverter, the voltages across DC positive buses PL1, PL2, and PL3 match with one another by a slight current (a current so small as not to exceed the rated current value of the fuse) flowing through wiring lines WP1 and WP2. The same applies to DC negative buses NL1, NL2, and NL3 and DC neutral buses CL1, CL2, and CL3.

Contrastingly, only when the IGBT device fails and shorts out in any of converter units U1 to U3, as shown in FIGS. 4 and 5, a current exceeding the rated current value of the fuse flows through wiring lines WP1, WP2, WN1, WN2, WC1, and WC2. Melting of the fuse in this case avoids the occurrence of overcurrent and overvoltage.

That is to say, in power conversion apparatus 100 according to the present embodiment, there is no need to take into account a current flowing during normal operation for the fuse; it suffices that a configuration for reliably melting the fuse when current flows through the wiring line due to the occurrence of a failure is provided. This allows the use of a fuse having a rated current value lower than that of the fuse used in power conversion apparatus 1000 according to the comparative example.

Consequently, the fuse melts before a current larger than the current flowing through the converter or the inverter during normal operation flows from the occurrence of a failure, thus protecting power conversion apparatus 100 from overcurrent and overvoltage.

Further, power conversion apparatus 100 according to the present embodiment can have fewer fuses than power conversion apparatus 1000 according to the comparative example. The present embodiment can halve the number of fuses. Power conversion apparatus 100 according to the present embodiment can thus reduce the size and cost of the power conversion apparatus.

Also, during the normal operation of each of converter units U1 to U3, no current flows through the fuse, thus eliminating a power loss caused by the fuse. Thus, power conversion apparatus 100 according to the present embodiment can have improved efficiency.

Figure 8:
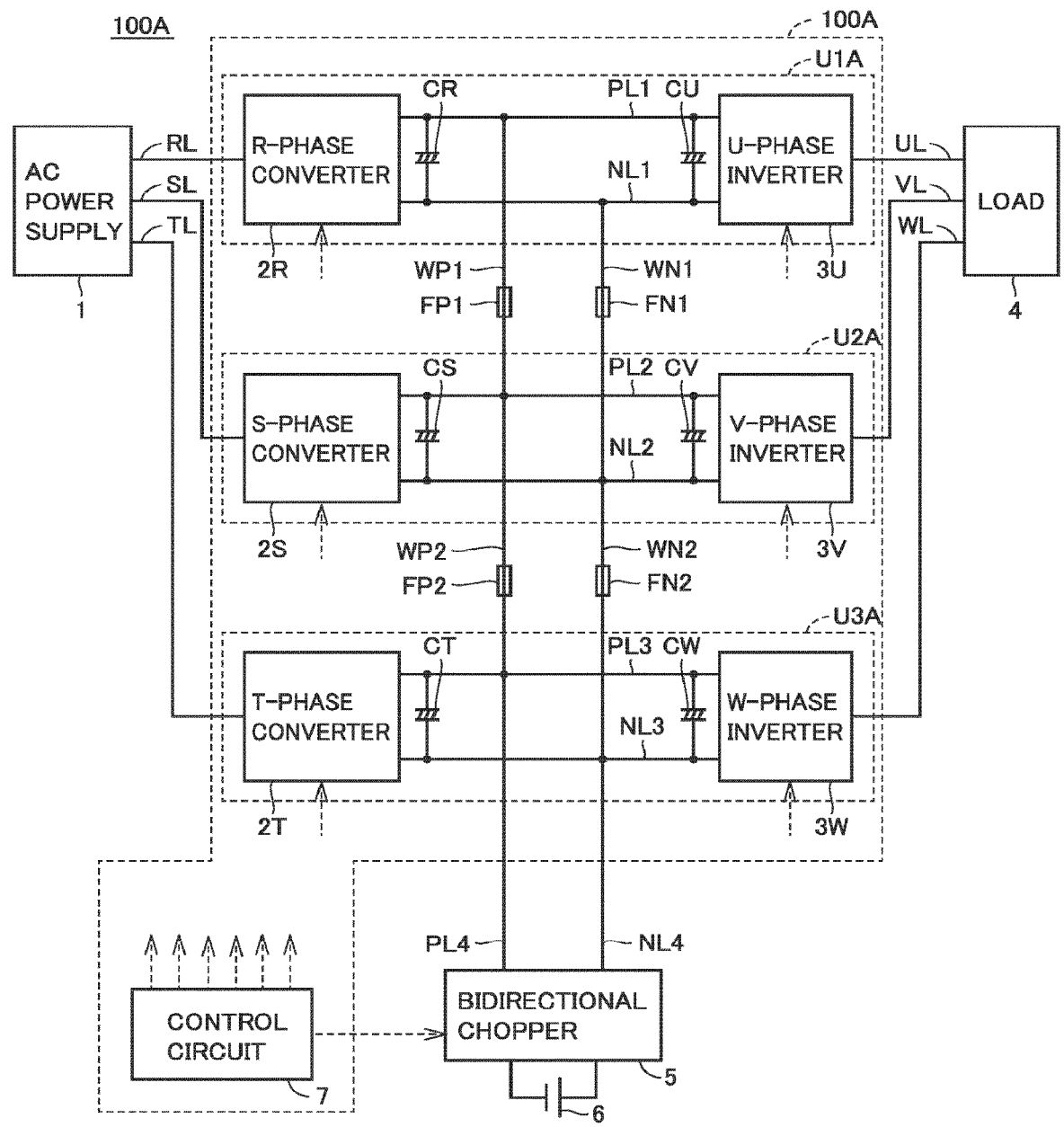
FIG. 8 is a schematic block diagram showing a main circuit configuration of a power conversion apparatus according to a modification of the embodiment of the present invention.

Although single-phase converters 2R, 2S, and 2T are three-level converters, and single-phase inverters 3U, 3V, and 3W are three-level inverters in the embodiment described above, the single-phase converter may be a two-level converter and the single-phase inverter may be a two-level inverter. FIG. 8 is a circuit diagram illustrating the configuration of a power conversion apparatus 100A according to a modification of the embodiment. As shown in FIG. 8, each converter unit includes two DC buses (DC positive bus and DC negative bus), and two capacitors connected in parallel between the two DC buses. Also in this modification, the fuse melts if the IGBT device fails and shorts out in any of the single-phase converter and the single-phase inverter, thus achieving effects similar to those of the embodiment.

In the embodiment and the modification thereof, converter units U1 to U3 correspond to the "first to third power converters", respectively. The R-phase converter, the S-phase converter, and the T-phase converter corresponding to the "first to third power converters" correspond to the "first-phase converter", the "second-phase converter", and the "third-phase converter" in the present invention, respectively, and the U-phase inverter, the V-phase inverter, and the W-phase inverter corresponding to the "first to third power converters" correspond to the "fourth-phase inverter", the "fifth-phase inverter", and the "sixth-phase inverter" in the present invention, respectively. DC positive buses PL1 to PL4 correspond to the "first to fourth DC positive buses" in the present invention, respectively, DC negative buses NL1 to NL4 correspond to the "first to fourth DC negative buses" in the present invention, respectively, and DC neutral buses CL1 to CL4 correspond to the "first to fourth DC neutral buses" in the present invention, respectively.

It should be construed that the embodiments disclosed herein are given by way of illustration in all respects, not by way of limitation. It is therefore intended that the scope of the present invention is defined by claims, not only by the embodiments described above, and encompasses all modifications and variations equivalent in meaning and scope to the claims.

REFERENCE SIGNS LIST 2 converter, 2R R-phase converter, 2S S-phase converter, 2T T-phase converter, 3 inverter, 3U U-phase inverter, 3V V-phase inverter, 3W W-phase inverter, 5 bidirectional chopper, 6 DC power supply, Q1R-Q4R, Q1S-Q4S, Q1T-Q4T, Q1U-Q4U, Q1V-Q4V, Q1W-Q4W IGBT device, D1R-D4R, D1S-D4S, D1T-D4T, D1U-D4U, D1V-D4V, D1W-D4W diode, 100, 1000 power conversion apparatus, PL, PL1-PL4 DC positive bus, NL, NL1-NL4 DC negative bus, CL, CL1-CL4 DC neutral bus, C1R, C1S, C1T, C2R, C2S, C2T, C3R, C3S, C3T, C1U, C1V, C1W, C2U, C2V, C2W, C3U, C3V, C3W capacitor, FP1, FP2, FN1, FN2, FC1, FC2 fuse, WP1, WP2, WN1, WN2, WC1, WC2 wiring line.

The invention claimed is:

1. A power conversion apparatus for converting first-phase, second-phase, and third-phase AC voltages supplied from an AC power supply into fourth-phase, fifth-phase, and sixth-phase AC voltages and supplying the fourth-phase, fifth-phase, and sixth-phase AC voltages to a load, the power conversion apparatus comprising:

a first power converter configured to convert the first-phase AC voltage into the fourth-phase AC voltage;

a second power converter configured to convert the second-phase AC voltage into the fifth-phase AC voltage; and a third power converter configured to convert the third-phase AC voltage into the sixth-phase AC voltage;

the first power converter including
a first-phase converter configured to convert the first-phase AC voltage into a first DC voltage,
a fourth-phase inverter configured to convert the first DC voltage supplied from the first-phase converter into the fourth-phase AC voltage, and
a first DC positive bus and a first DC negative bus connected between the first-phase converter and the fourth-phase inverter, the second power converter including
a second-phase converter configured to convert the second-phase AC voltage into a second DC voltage, a fifth-phase inverter configured to convert the second DC voltage supplied from the second-phase converter into the fifth-phase AC voltage, and a second DC positive bus and a second DC negative bus connected between the second-phase converter and the fifth-phase inverter, the third power converter including a third-phase converter configured to convert the third-phase AC voltage into a third DC voltage, a sixth-phase inverter configured to convert the third DC voltage supplied from the third-phase converter into the sixth-phase AC voltage, and a third DC positive bus and a third DC negative bus connected between the third-phase converter and the sixth-phase inverter, the power conversion apparatus further comprising:

a first fuse connected between the first and second DC positive buses and a second fuse connected between the second and third DC positive buses; and a third fuse connected between the first and second DC negative buses and a fourth fuse connected between the second and third DC negative buses.

2. The power conversion apparatus according to claim 1, further comprising:

a fourth DC positive bus connected with the third DC positive bus;

a fourth DC negative bus connected with the third DC negative bus; and a DC voltage converter provided between the fourth DC positive and fourth DC negative buses and a DC power supply, and configured to perform bidirectional DC voltage conversion between the fourth DC positive and fourth DC negative buses and the DC power supply.

3. The power conversion apparatus according to claim 1, wherein each of the first-phase, second-phase, and third-phase converters is a three-level converter, each of the fourth-phase, fifth-phase, and sixth-phase inverters is a three-level inverter, the first power converter further includes a first DC neutral bus connected between the first-phase converter and the fourth-phase inverter, the second power converter further includes a second DC neutral bus connected between the second-phase converter and the fifth-phase inverter, the third power converter further includes a third DC neutral bus connected between the third-phase converter and the sixth-phase inverter, and the power conversion apparatus further comprises a fifth fuse connected between the first and second DC neutral buses and a sixth fuse connected between the second and third DC neutral buses.

4. The power conversion apparatus according to claim 3, further comprising:

a fourth DC positive bus connected with the third DC positive bus;

a fourth DC negative bus connected with the third DC negative bus;

a fourth DC neutral bus connected to the third DC neutral bus; and a DC voltage converter provided between the fourth DC positive bus, the fourth DC negative bus, and the fourth DC neutral bus and the DC power supply, and configured to perform bidirectional DC voltage conversion between the fourth DC positive, fourth DC negative, and fourth DC neutral buses and the DC power supply.

* * * * *